(12) United States Patent
Rathmer

(10) Patent No.: US 12,610,889 B2
(45) Date of Patent: Apr. 28, 2026

(54) HARVESTING ATTACHMENT WITH HEIGHT-ADJUSTABLE CROSS-FEEDING AUGER

(71) Applicant: DEERE & COMPANY, Moline, IL (US)

(72) Inventor: Mike Rathmer, Velen-Ramsdorf (DE)

(73) Assignee: DEERE & COMPANY, Moline, IL (US)

( * ) Notice: Subject to any disclaimer, the term of this patent is extended or adjusted under 35 U.S.C. 154(b) by 397 days.

(21) Appl. No.: 18/450,473

(22) Filed: Aug. 16, 2023

(65) Prior Publication Data

US 2024/0164254 A1 May 23, 2024

(30) Foreign Application Priority Data

Nov. 21, 2022 (DE) .......................... 102022130748.4

(51) Int. Cl.
*A01D 61/00* (2006.01)
*A01B 43/00* (2006.01)

(52) U.S. Cl.
CPC .......... *A01D 61/004* (2013.01); *A01B 43/005* (2013.01)

(58) Field of Classification Search
CPC .... A01D 61/004; A01D 43/08; A01D 43/088; A01D 43/086; A01D 41/10; A01D 41/142; A01D 15/10; A01B 43/005
USPC ............... 56/123, 14.3 I, 220, 222, 228, 341
See application file for complete search history.

(56) References Cited

U.S. PATENT DOCUMENTS

| | | | | |
|---|---|---|---|---|
| 2,269,977 A | * | 1/1942 | Johnson | A01D 41/144 56/123 |
| 2,518,521 A | * | 8/1950 | Carroll | A01D 61/008 56/158 |
| 2,652,677 A | * | 9/1953 | Krause | A01D 41/04 460/59 |
| 2,835,100 A | * | 5/1958 | Mcclellan | A01D 41/142 100/142 |
| 3,233,395 A | * | 2/1966 | Dahl | A01D 61/008 56/192 |
| 3,977,164 A | * | 8/1976 | Ashton | A01D 61/00 198/666 |
| 4,300,333 A | * | 11/1981 | Anderson | A01D 61/008 198/666 |

(Continued)

FOREIGN PATENT DOCUMENTS

| | | | | | |
|---|---|---|---|---|---|
| CN | 107529723 A | * | 1/2018 | | A01D 67/00 |
| CN | 113439546 A | * | 9/2021 | | A01D 45/02 |

(Continued)

OTHER PUBLICATIONS

Extended European Search Report and Written Opinion issued in European Patent Application No. 23206449.3, dated Apr. 5, 2024, in 14 pages.

*Primary Examiner* — Joseph M Rocca
*Assistant Examiner* — Sunny D Webb

(57) ABSTRACT

A harvesting attachment includes a supporting frame, which is movable in a forward direction over a field. A pick-up device is attached to the supporting frame for picking up crop produce from the field. A height-adjustable cross-feeding auger is attached to the supporting frame. The cross-feeding auger is driveable by a drive shaft rotatably supported on the frame. A telescopic cardan shaft is arranged between the drive shaft and the cross-feeding auger to communicate torque therebetween.

17 Claims, 4 Drawing Sheets

(56)                     References Cited

U.S. PATENT DOCUMENTS

| | | | | | |
|---|---|---|---|---|---|
| 4,409,780 | A | | 10/1983 | Beougher et al. | |
| 4,622,805 | A | * | 11/1986 | Johnson | A01D 41/14 |
| | | | | | 56/220 |
| 5,090,187 | A | * | 2/1992 | Mews | A01D 41/10 |
| | | | | | 56/364 |
| 5,261,216 | A | * | 11/1993 | Schumacher | A01D 41/14 |
| | | | | | 56/14.4 |
| 6,167,686 | B1 | * | 1/2001 | Becker | F16H 7/1281 |
| | | | | | 56/17.3 |
| 7,562,879 | B1 | * | 7/2009 | Blakeslee | F16J 15/445 |
| | | | | | 277/645 |
| 7,587,885 | B2 | * | 9/2009 | Tippery | A01D 57/20 |
| | | | | | 56/14.5 |
| 10,349,580 | B2 | * | 7/2019 | Barnett | A01D 61/004 |
| 2020/0390034 | A1 | * | 12/2020 | Talbot | A01D 41/142 |

FOREIGN PATENT DOCUMENTS

| | | | | | |
|---|---|---|---|---|---|
| DE | 10241216 | A1 | | 3/2004 | |
| DE | 102005062266 | A1 | | 6/2007 | |
| DE | 102010028605 | A1 | | 11/2011 | |
| EP | 0139264 | A1 | * | 5/1985 | A01D 69/00 |
| EP | 1444881 | A2 | | 8/2004 | |
| EP | 1738634 | A1 | * | 1/2007 | A01D 61/008 |
| EP | 3235364 | A1 | | 10/2017 | |

* cited by examiner

HARVESTING ATTACHMENT WITH HEIGHT-ADJUSTABLE CROSS-FEEDING AUGER

CROSS-REFERENCE TO RELATED APPLICATIONS

This application claims the benefit of German Patent Application DE 102022130748.4, filed on Nov. 21, 2022, the disclosure of which is hereby incorporated by reference.

TECHNICAL FIELD

The disclosure generally relates to a harvesting attachment for a harvesting machine.

BACKGROUND

Harvesting attachments are used in agriculture to pick up crop lying or standing on a field and to convey it into a harvesting machine that is self-propelled or moved across a field by a tractor. Cross-feeding augers are used to laterally cross-feed the harvested crop in some harvesting attachments, such as cutterbars, corn pickers, and windrow pickers. The windrow pickers are used to pick up crop produce, which has usually been previously dried and laid in a swath, and feed it to the harvesting machine, where it may be pressed into a bale (e.g., a baler implement), collected and conveyed for transport away (e.g., into a loader wagon), chopped (e.g., a forage harvester) or threshed (e.g., a combine harvester).

Such windrow pickers usually comprise a pick-up drum with tines attached to tine carriers extending transversely to the forward direction. The tine carriers are set in motion by rotating a holder that supports them. The tines extend outward through spaces remaining between scrapers attached to the framework of the windrow picker and move along these spaces. Downstream of the pick-up drum, there usually follows the cross-feeding auger, which feeds or moves the crop produce laterally toward an inlet of the harvesting machine, where it may be further processed (cut or threshed), collected or pressed.

In the prior art, the cross-feeding augers may be non-adjustably attached to the frame of the harvesting attachment, or they may be height-adjustably mounted to the frame so that they can move upwards and/or downwards depending on the crop flow. For this purpose, they are usually mounted at the ends on rockers that are articulated about a transverse axis on pivot bearings that are offset rearwards relative to the axis of rotation of the cross-feeding augers (DE 102 41 216 A1, EP 1 738 634 A1). The cross-feeding augers can thus deflect upwards when the swath height increases.

The height-adjustable cross-feeding augers are usually driven by chain drives (see U.S. Pat. No. 4,622,805 A for a grain cutting unit with height-adjustable cross-feeding auger). Such chain drives do indeed allow vertical movement, but are maintenance-intensive and prone to wear.

SUMMARY

A harvesting attachment is provided. The harvesting attachment includes a supporting frame, which is movable in a forward direction over a field. A pick-up device for picking up crop produce from a field and a height-adjustable cross-feeding auger are attached to the supporting frame. The cross-feeding auger is driven by a drive shaft that is rotatably supported on the supporting frame. A telescopic cardan shaft is arranged between the drive shaft and the cross-feeding auger.

The harvesting attachment may include, but is not limited to, a windrow picker in which the pick-up device for picking up crop produce is designed as a pick-up drum. In other alternative implementations, the pick-up device may include, a cutterbar or corn picker.

The cardan shaft may be arranged in an end cavity of the cross-feeding auger. The cross-feeding auger can be rotatably supported at both ends by bearings disposed on rockers that are attached to the supporting frame at pivot bearings with a respective axis of rotation extending in the transverse direction. The cross-feeding auger conveyor may include a tube provided on its outer side with helical drivers.

In one possible implementation, the bearings are arranged between the rocker and the inside of the tube of the cross-feeding auger. This arrangement is relatively simple in design, but requires relatively large bearings.

In another implementation, a (cylindrical) wall rigidly connected to the rocker extends inwardly from the rocker in the interior of the tube and forms a cavity in which the cardan shaft is arranged. In this case, an output shaft rigidly connected to the tube (in particular by a mounting extending radially to the tube) can be supported by a bearing on a support disk connected to the wall. This design gets by with smaller bearings than the previously described implement.

The harvesting attachment may be used on a self-propelled, towed or attached harvesting machines, such as but not limited to a forage harvester, a loader wagon, a baler implement or a combine harvester.

The combination of the drive shaft and the telescopic cardan shaft provides a reduced wear and maintenance drive system for the cross-feeding auger when compared to the previously used chain drive systems.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward,"

"top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
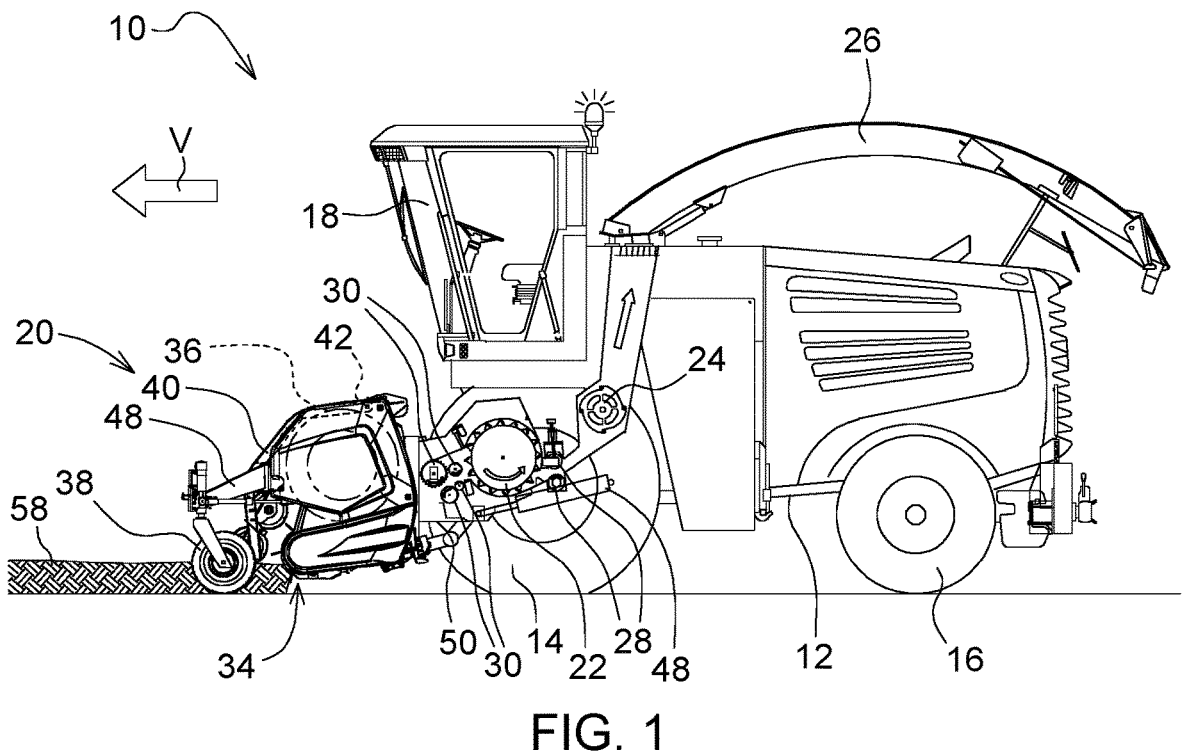
FIG. 1 is a schematic side view of a forage harvester with a harvesting attachment in the form of a windrow picker.

Referring to the Figures, wherein like numerals indicate like parts throughout the several views, a harvesting machine is generally shown at 10 in FIG. 1. The harvesting machine 10 shown in the Figures and described herein is configured as a self-propelled forage harvester. However, it should be appreciated that the harvesting machine 10 may be configured as a different implement type, e.g., a baler implement, a combine harvester, a loader wagon, etc.

The forage harvester 10 is built on a framework 12 supported by front driven wheels 14 and steerable rear wheels 16. The forage harvester 10 is operated from a driver's cab 18, from which a harvesting attachment 20 is visible. In the example implementation shown in the Figures and described herein, the harvesting attachment 20 is configured as a windrow picker 20. However, it should be appreciated that the harvesting attachment 20 may be configured as a different attachment type than the example windrow picker described herein. Crop produce, such as grass or the like, picked up from the ground by means of the windrow picker 20, is fed to a chopping drum 22 via an intake conveyor with pre-press rollers 30 arranged within an intake housing 50 on the front side of the forage harvester 10, which chopping drum chops the crop into small pieces and feeds it to a discharge accelerator 24. The crop exits the forage harvester 10 to a trailer, traveling alongside, via a discharge elbow 26 that is rotatable about an approximately vertical axis and is adjustable in inclination. Between the chopping drum 22 and the conveyor device 24 there extends a secondary comminution device 28 having two grain processor rollers through which the crop to be conveyed is fed, tangentially, to the conveyor device 24. The secondary comminution device 28 is particularly needed during corn harvesting to strike grains, and is removed or moved to an ineffective open position during grass harvesting.

The windrow picker 20 is designed as a so-called pick-up. The windrow picker 20 is mounted on a frame 32 and is supported (at least partially) on the ground by means of support wheels 38 mounted on both sides, each of which wheels is attached to the frame 32 by means of a carrier 48. The task of the windrow picker 20 is to pick up crop produce scattered on the ground of a field or deposited in a swath 58 and to feed it to the harvesting machine 10 for further processing. For this purpose, the windrow picker 20 is moved over the field at a small distance from the ground during harvesting operation, while for transport on a road or on paths it is raised by means of a hydraulic cylinder 48, which pivots the intake housing 50 and the windrow picker 20 attached thereto about the axis of rotation of the chopping drum 22. The hydraulic cylinder 48 is also used to adjust the height of the windrow picker 20 above the ground, or to adjust the contact pressure of the support wheels 38 on the ground.

The windrow picker 20 includes a cross-feeding auger 36 that conveys the picked-up crop from the sides of the windrow picker 20 to a rear discharge opening 44 located in the center, behind which the intake conveyor with the pre-press rollers 30 follows. The windrow picker 20 also has a rotationally driven pick-up drum 34, which is arranged below the cross-feeding auger 36 and lifts the crop from the ground with its tines in order to transfer the crop to the cross-feeding auger 36. The pick-up drum 34 can be of any design, i.e., can be provided with controlled or uncontrolled tines and arranged within a housing with scrapers, or the housing can be omitted.

In the following text, direction indications, such as sideways, downwards and upwards, relate to the forward movement direction V of the windrow picker 20, which is to the left in the figures.

Figure 2:
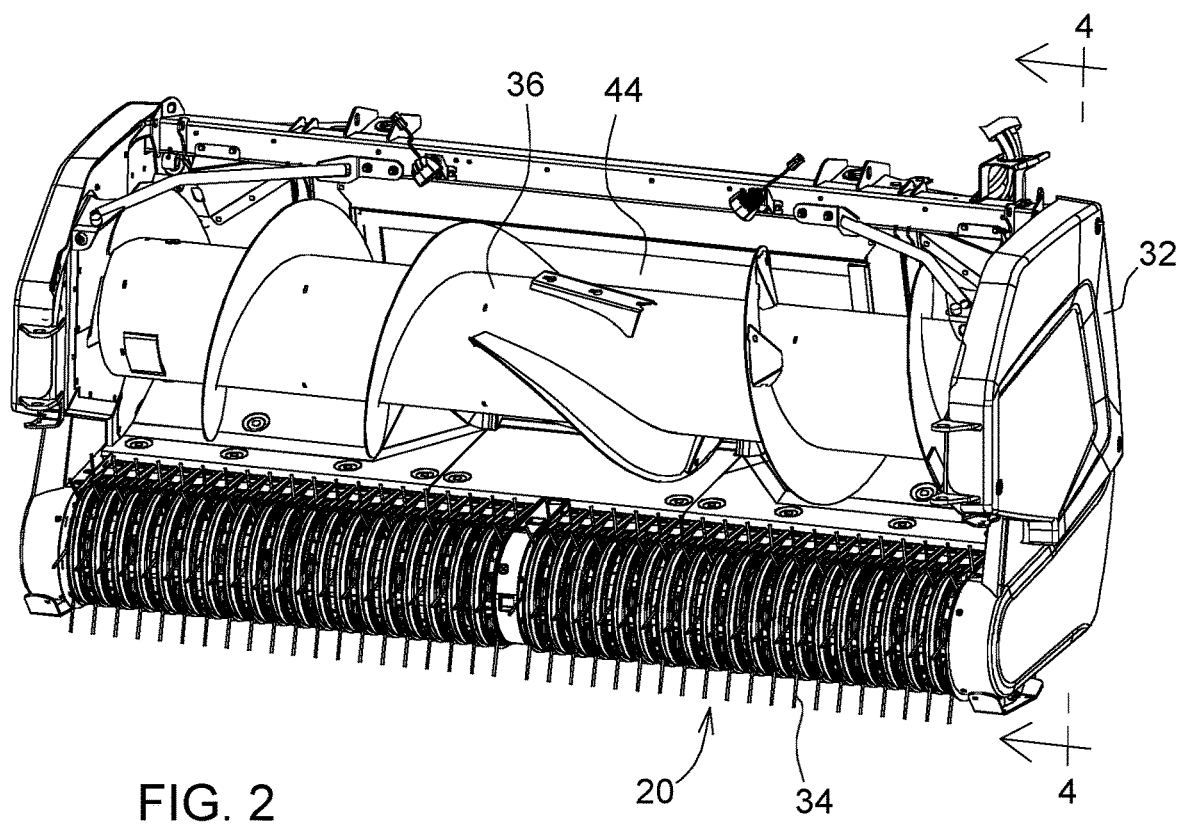
FIG. 2 is a schematic perspective view of the windrow picker viewed from a front left perspective.
Figures 3, 4:
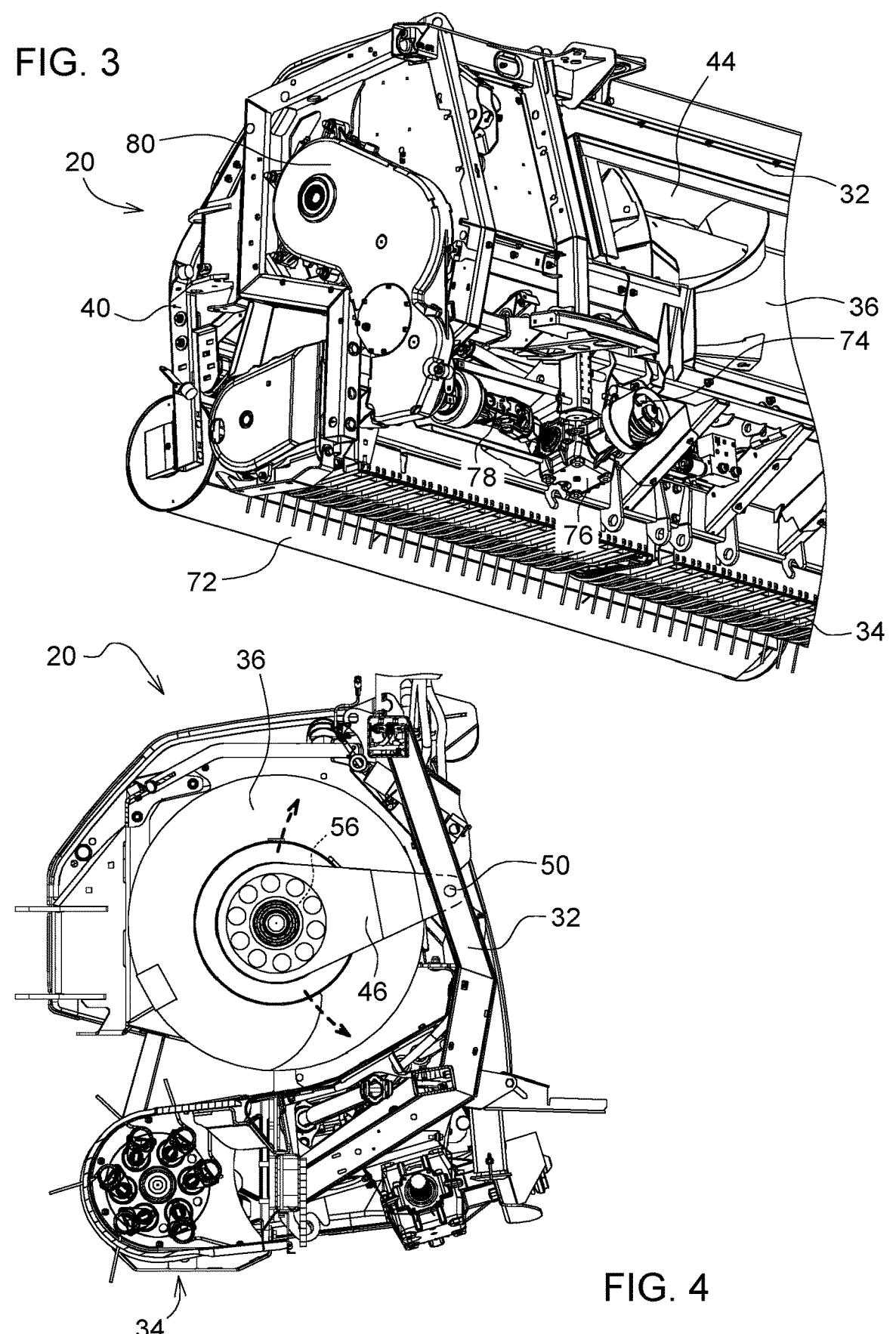
FIG. 3 is a schematic perspective rear view of the windrow picker viewed from a bottom left perspective.
FIG. 4 is a schematic cross section through the windrow picker along line 4-4 shown in FIG. 2.

The windrow picker 20 comprises a hold-down device 72 with two hold-down rollers, which are fastened between rockers 40. The rockers 40 extend arcuately on both sides of the windrow picker 20 from their front, lower end upwardly and rearwardly relative to the direction of travel, and are supported in the upper, rear region of the windrow picker 20, relative to the direction of travel, on pivot axles 42 on the frame 32 of the windrow picker 20 so as to be pivotable about a transverse axis. In FIGS. 2 and 4, the hold-down device is not shown for reasons of clarity, and this also applies analogously to the support wheels 38 and carrier 48.

Figures 5, 6:
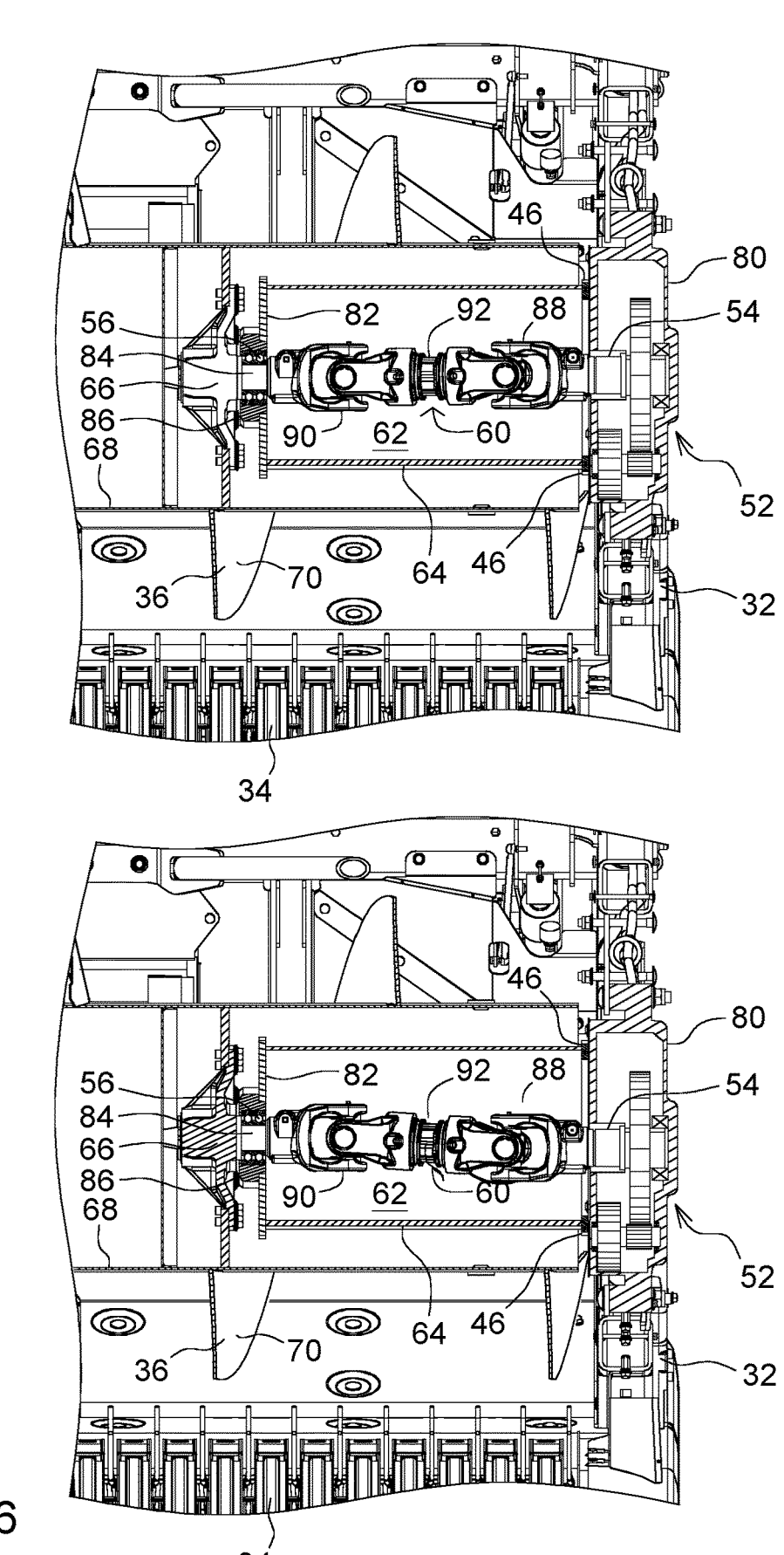
FIG. 5 is a schematic horizontal cross section of the windrow picker with the cross-feeding auger disposed in a center position.
FIG. 6 is a schematic horizontal cross section of the windrow picker with the cross-feeding auger disposed in a raised position.
Figures 7, 8:
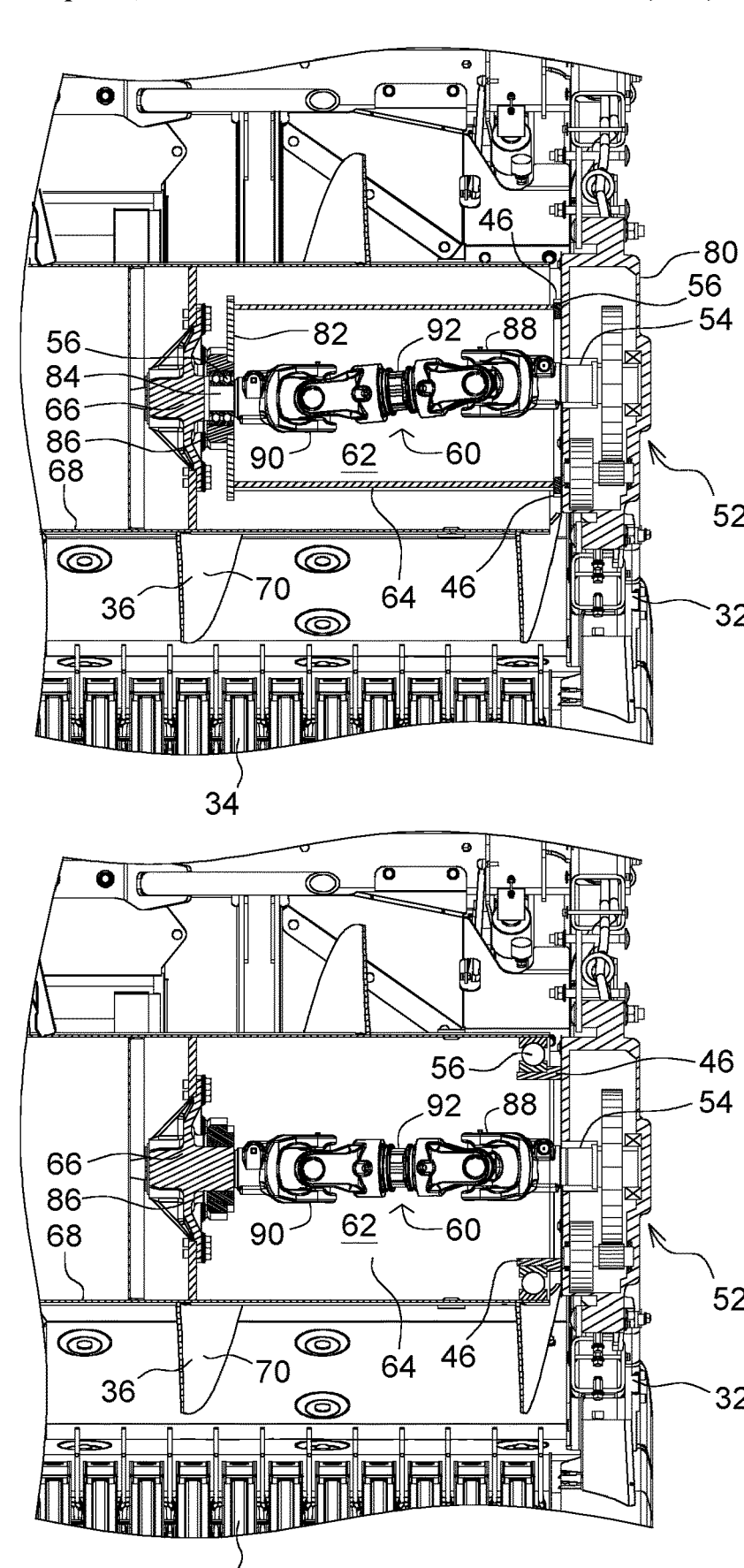
FIG. 7 is a schematic horizontal cross section of the windrow picker with the cross-feeding auger disposed in a lowered position.
FIG. 8 is a schematic horizontal cross section of an alternative implementation of the cross-feeding auger.

Reference is now made to FIGS. 2 to 8, of which FIG. 2 shows a perspective view of the windrow picker 20 from the front left, FIG. 3 shows a bottom view from the rear left, while FIG. 4 reproduces a vertical cross-section through the windrow picker 20 along cut line 4-4 shown in FIG. 2. FIGS. 5 to 7 show vertical sections through a left end portion of the cross-feeding auger 36 and the adjacent region of the frame 32. FIG. 8 shows an alternative embodiment of the cross-feeding auger 36.

As shown in FIG. 3, the cross-feeding auger 36 is driven from the forage harvester 10 via a mechanical drive train by means of a (cardan) shaft (not shown in FIG. 3) extending forward from the forage harvester 10 or its intake housing 50. The cardan shaft is connectable to an input coupling 74. A possible arrangement for this is shown in DE 10 2010 028 605 A1. The input coupling 74 is connected via an angular gear 76 to a further transversely extending cardan shaft 78, which drives a gear assembly 80 arranged laterally on the frame 32. On the output side, cf. FIG. 5, the gear assembly 80 comprises a gear train 52, which drives a drive shaft 54, which is rotatably supported on the frame 32. The gear train 52 or (directly, without an intervening gear train) the drive shaft 54 could also be driven by a hydraulic or electric motor located on the windrow picker 20 and supplied from the forage harvester 10.

The cross-feeding auger 36 comprises a cylindrical tube 68 with helical flights 70 attached thereto. On the basis of FIGS. 4 to 7, it can be seen that the cross-feeding auger 36 is supported at both ends on rockers 46, which are attached to the frame 32 at pivot bearings 50 having axes of rotation extending in the transverse direction relative to the forward direction. Thus, the rockers 46 can rotate with the cross-feeding auger 36 about the axes of rotation of the pivot bearings 50 located rearward of the cross-feeding auger 36 and approximately at the height thereof, allowing the cross-feeding auger 36 to move upwardly and downwardly depending on the throughput of material or the height of the swath 58. The range of movement of the rockers 46 may be limited by fixed or adjustable stops in an upward and/or downward direction. The cross-feeding auger 36 can rotate about its own axis of rotation and symmetry, as it is rotatably attached to the rockers 46 by the bearings 56.

To permit the vertical movement of the cross-feeding auger 36, the drive shaft 54 is drivingly connected to the cross-feeding auger 36 by a telescopic cardan shaft 60 having a first universal joint 88 connected to the drive shaft 54, a second universal joint 90 coupled to the cross-feeding auger 35, and a telescopic section 92 between the first universal joint 88 and the second universal joint 90. The cardan shaft 60 is arranged in an end cavity 62, which is bounded outwardly by a wall 64 extending axially with respect to the axis of symmetry and rotation of the tube 68. This wall 64 is circular in cross-section, i.e., cylindrical, in design here, but could have any other cross-section or could taper conically inwardly. The wall 64 is rigidly connected to the rocker 46 at its lateral outer end.

At its inner end, the wall 64 is connected to a support disk 82 extending radially to the tube 68. In its center, the support disk 82 is provided with an opening. At the opening, the outer ring of the bearing 56 is connected to the support disk 82. Through the inner ring of the bearing 56 there extends an output shaft 84 attached thereto, which is connected on the one hand to the inner end of the cardan shaft 60 and on the other hand to a mounting 66, in each case in a rotationally fixed manner. The mounting 66 is rigidly connected to the tube 68 of the cross-feeding auger 36. Sealing means 86 can be arranged between the wall 64 and the mounting 66 and can be in the form of a rigid ring connected to the wall 64 and a flexible seal cooperating therewith and connected to the mounting 66 (or vice versa).

The telescopic cardan shaft 60 allows for torque transmission and up and down movement of the cross-feeding auger 36, as shown in FIGS. 6 and 7.

At the right-hand end of the cross-feeding auger 36, not shown in FIGS. 5 to 7, a rotatable connection is also provided between the cross-feeding auger 36 and the rocker

46 arranged there. However, since there is no drive connection and no cardan shaft 60 there, the mounting 66 can be moved completely to the outside and the bearing 56 can be attached directly between the mounting 66 and a radially inwardly extending wall of the rocker 46, which assumes the function of the wall 82 of FIGS. 5 to 7.

In a second implementation of the cross-feeding auger shown in FIG. 8, the bearing 56 is arranged directly between a ring extending inwardly from the rocker 46 and the inner wall of the tube 68. The attachment of the cardan shaft 60 to the output shaft 54 and to the support disk 66 and the associated method of operation are the same as in the first implementation of FIGS. 5-7. The support of the cross-feeding auger 36 at its right-hand end, which is not shown, corresponds to that shown in FIG. 8, but there the cardan shaft 66 and the support disk 66 are omitted.

In a second implementation of the cross-feeding auger shown in FIG. 8, the bearing 56 is arranged directly between a ring extending inwardly from the rocker 46 and the inner wall of the tube 68. The attachment of the cardan shaft 60 to the drive shaft 54 and to the support disk 66 and the associated method of operation are the same as in the first implementation of FIGS. 5-7. The support of the cross-feeding auger 36 at its right-hand end, which is not shown, corresponds to that shown in FIG. 8, but there the cardan shaft 66 and the support disk 66 are omitted.

What is claimed is:

1. A harvesting attachment for a harvesting machine, the harvesting attachment comprising:
   a supporting frame movable in a forward direction over a field;
   a cross-feeding auger moveably attached to the supporting frame for relative movement therebetween;
   a drive shaft rotatably supported on the supporting frame;
   a telescopic cardan-shaft interconnecting the drive shaft and the cross-feeding auger for transmitting torque therebetween;
   wherein the cross-feeding auger defines an end cavity, with the telescopic cardan shaft disposed within the end cavity of the cross-feeding auger; and
   wherein the cross-feeding auger is rotatably supported at both ends by respective bearings disposed on a respective rocker that is attached to the supporting frame at respective pivot bearings with respective axes of rotation extending in the transverse direction.

2. The harvesting attachment set forth in claim 1, wherein the cross-feeding auger includes a tube provided on an outer surface thereof with helical flights.

3. The harvesting attachment set forth in claim 2, wherein each respective one of the bearings is arranged between a respective one of the rockers and an inner surface of the tube of the cross-feeding auger.

4. The harvesting attachment set forth in claim 2, further comprising a wall rigidly connected to a respective one of the rockers, with the wall extending axially inwardly from the rocker along the axis of rotation thereof into an interior of the tube, wherein the wall forms the end cavity in which the cardan shaft is disposed.

5. The harvesting attachment set forth in claim 4, wherein the wall is disposed within the end cavity of the cross-feeding auger.

6. The harvesting attachment set forth in claim 4, further comprising an output shaft rigidly connected to the tube by a mounting supported by a bearing on a support disk connected to the wall.

7. The harvesting attachment set forth in claim 1, wherein the telescopic cardan-shaft includes a first universal joint coupled to the drive shaft, a second universal joint coupled to the cross-feeding auger, and a telescopic section disposed between the first universal joint and the second universal joint.

8. The harvesting attachment set forth in claim 1, further comprising a pick-up device coupled to the supporting frame and operable to pick up crop produce from the field.

9. The harvesting attachment set forth in claim 7, wherein the pick-up device is a windrow picker including a pick-up drum.

10. A harvesting attachment for a harvesting machine, the harvesting attachment comprising:

a supporting frame moveable in a forward direction;

a cross-feeding auger moveably attached to the supporting frame for relative movement therebetween;

a drive shaft rotatably supported on the supporting frame for rotation about an axis transverse to the forward direction;

a telescopic cardan-shaft having a first universal joint coupled to the drive shaft, a second universal joint coupled to the cross-feeding auger, and a telescopic section disposed between the first universal joint and the second universal joint, wherein the telescopic cardan-shaft is operable to transmit torque between the drive shaft and the cross-feeding auger; and wherein the cross-feeding auger includes a tube defining an end cavity therein, with the telescopic cardan-shaft disposed within the end cavity of the tube of the cross-feeding auger.

11. The harvesting attachment set forth in claim 10, further comprising a mounting rigidly attached to an inner surface of the tube for rotation with the tube, with the second universal joint of the telescopic cardan-shaft coupled to the mounting for rotation therewith.

12. A harvesting machine comprising:

a supporting frame movable in a forward direction over a field;

a pick-up device coupled to the supporting frame and operable to pick up crop produce from the field;

a cross-feeding auger moveably attached to the supporting frame for relative movement therebetween;

a drive shaft rotatably supported on the supporting frame for rotation about an axis transverse to the forward direction;

a telescopic cardan-shaft interconnecting the drive shaft and the cross-feeding auger for transmitting torque therebetween; and wherein the cross-feeding auger includes a tube defining an end cavity therein, with the telescopic cardan-shaft disposed within the end cavity of the tube of the cross-feeding auger.

13. The harvesting machine set forth in claim 12, wherein the telescopic cardan-shaft includes a first universal joint coupled to the drive shaft, a second universal joint coupled to the cross-feeding auger, and a telescopic section disposed between the first universal joint and the second universal joint.

14. The harvesting machine set forth in claim 12 further comprising a mounting rigidly attached to an inner surface of the cross-feeding auger within an end cavity thereof, wherein the mounting is rotatable with the cross-feeding auger.

15. The harvesting machine set forth in claim 14, wherein the telescopic cardan-shaft is coupled to the mounting for rotation therewith.

16. The harvesting attachment set forth in claim 10, wherein the cross-feeding auger is rotatably supported at both ends by respective bearings disposed on a respective rocker that is attached to the supporting frame at respective pivot bearings with respective axes of rotation extending in the transverse direction.

17. The harvesting machine set forth in claim 12, wherein the cross-feeding auger is rotatably supported at both ends by respective bearings disposed on a respective rocker that is attached to the supporting frame at respective pivot bearings with respective axes of rotation extending in the transverse direction.

* * * * *